United States Patent
Brown et al.

(10) Patent No.: US 8,121,274 B2
(45) Date of Patent: *Feb. 21, 2012

(54) METHOD AND APPARATUS FOR PROCESSING MULTIPLE SERVICES PER CALL

(75) Inventors: John C. Brown, Freehold, NJ (US); Koan S. Chong, East Brunswick, NJ (US); Robert Peters, Rumson, NJ (US); Mark A. Ratcliffe, Oakhurst, NJ (US); Harish Samarasinghe, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/620,447

(22) Filed: Nov. 17, 2009

(65) Prior Publication Data
US 2010/0061277 A1    Mar. 11, 2010

Related U.S. Application Data

(63) Continuation of application No. 11/322,099, filed on Dec. 28, 2005, now Pat. No. 7,657,015.

(51) Int. Cl.
*H04M 3/42* (2006.01)
(52) U.S. Cl. .................. 379/201.02; 370/352; 370/353; 370/354; 370/355; 370/356; 379/207.02; 379/221.06; 379/221.08; 379/229; 709/201; 709/202; 709/203; 709/228; 709/229

(58) Field of Classification Search .......... 370/351–356, 370/259–271; 379/201.02, 207.02, 207.11, 379/221.05, 221.08, 243, 67.1–88.28, 93.12, 379/93.13, 122.06–112.1, 133, 201.01–201.05, 379/211.01, 221.01–221.11, 225, 229, 265.01–266.1; 709/201–207, 217–232; 348/14.01–14.16
See application file for complete search history.

(56) References Cited

U.S. PATENT DOCUMENTS

| | | | |
|---|---|---|---|
| 5,404,396 A | 4/1995 | Brennan | |
| 6,295,447 B1 | 9/2001 | Reichelt et al. | |
| 6,535,596 B1 | 3/2003 | Frey et al. | |
| 6,556,996 B1 | 4/2003 | Kovarik et al. | |
| 6,791,586 B2 * | 9/2004 | Baker | 715/811 |
| 6,823,056 B1 * | 11/2004 | Hussain | 379/207.02 |
| 7,003,688 B1 | 2/2006 | Pittelkow et al. | |
| 7,065,188 B1 * | 6/2006 | Mei et al. | 379/88.23 |
| 7,124,413 B1 | 10/2006 | Klemm et al. | |
| 7,221,945 B2 * | 5/2007 | Milford et al. | 455/452.1 |
| 7,388,950 B2 | 6/2008 | Elsey et al. | |
| 7,606,905 B1 * | 10/2009 | Atluri et al. | 709/226 |
| 7,657,015 B1 * | 2/2010 | Brown et al. | 379/201.02 |
| 2001/0011228 A1 | 8/2001 | Shenkman | |
| 2004/0117470 A1 * | 6/2004 | Rehm | 709/223 |
| 2005/0249196 A1 | 11/2005 | Ansari et al. | |
| 2006/0115068 A1 | 6/2006 | Dotan et al. | |
| 2006/0206604 A1 * | 9/2006 | O'Neil et al. | 709/223 |
| 2007/0121852 A1 | 5/2007 | Taylor et al. | |
| 2007/0242819 A1 | 10/2007 | Bozionek et al. | |

* cited by examiner

*Primary Examiner* — Hemant Patel

(57) ABSTRACT

A method and apparatus for enabling multiple services to be invoked in a specific precedence per call are disclosed. For example, the present method allows a subscriber to interact with a plurality of services provided by a service provider on a single call.

20 Claims, 7 Drawing Sheets

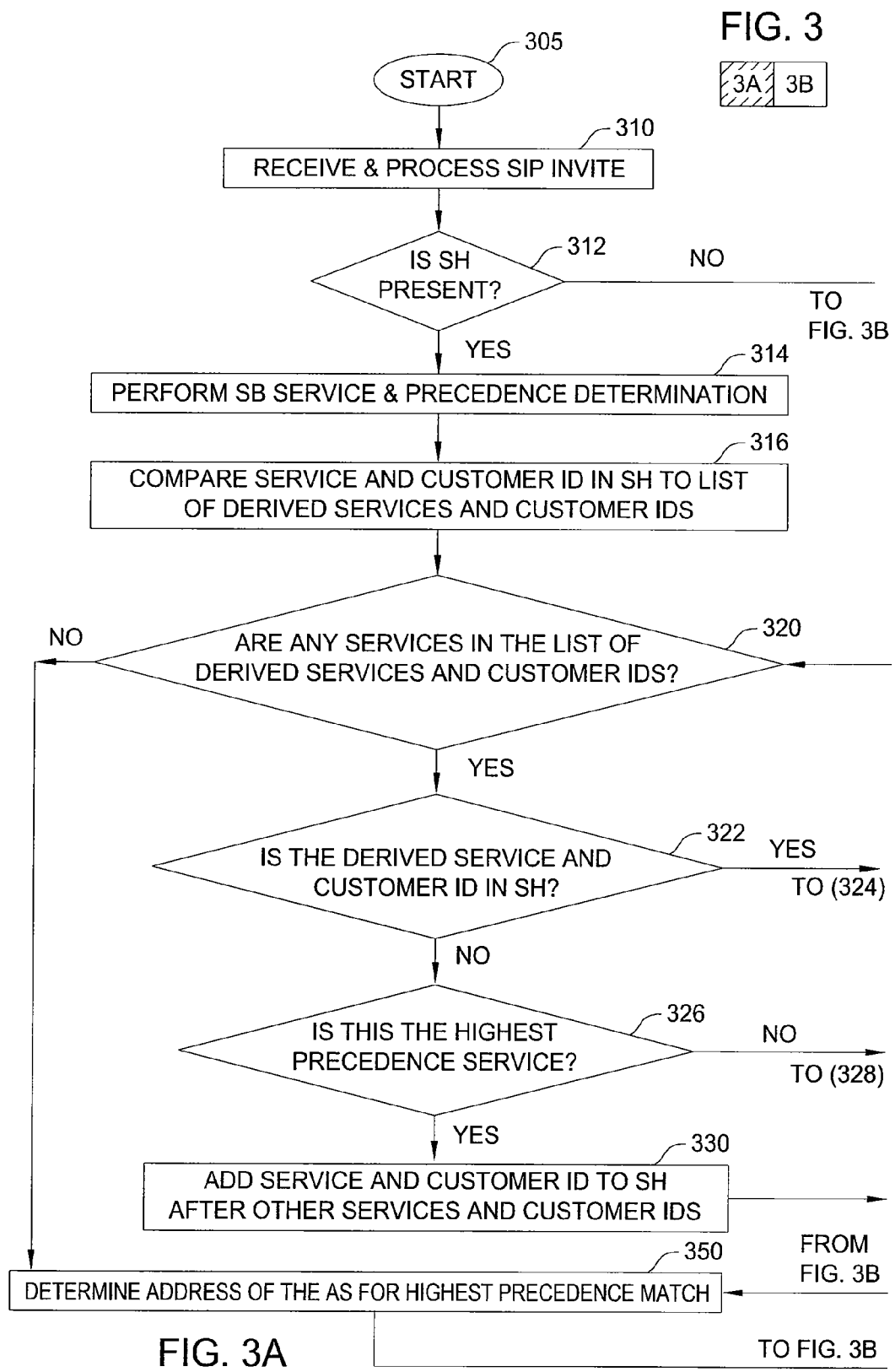

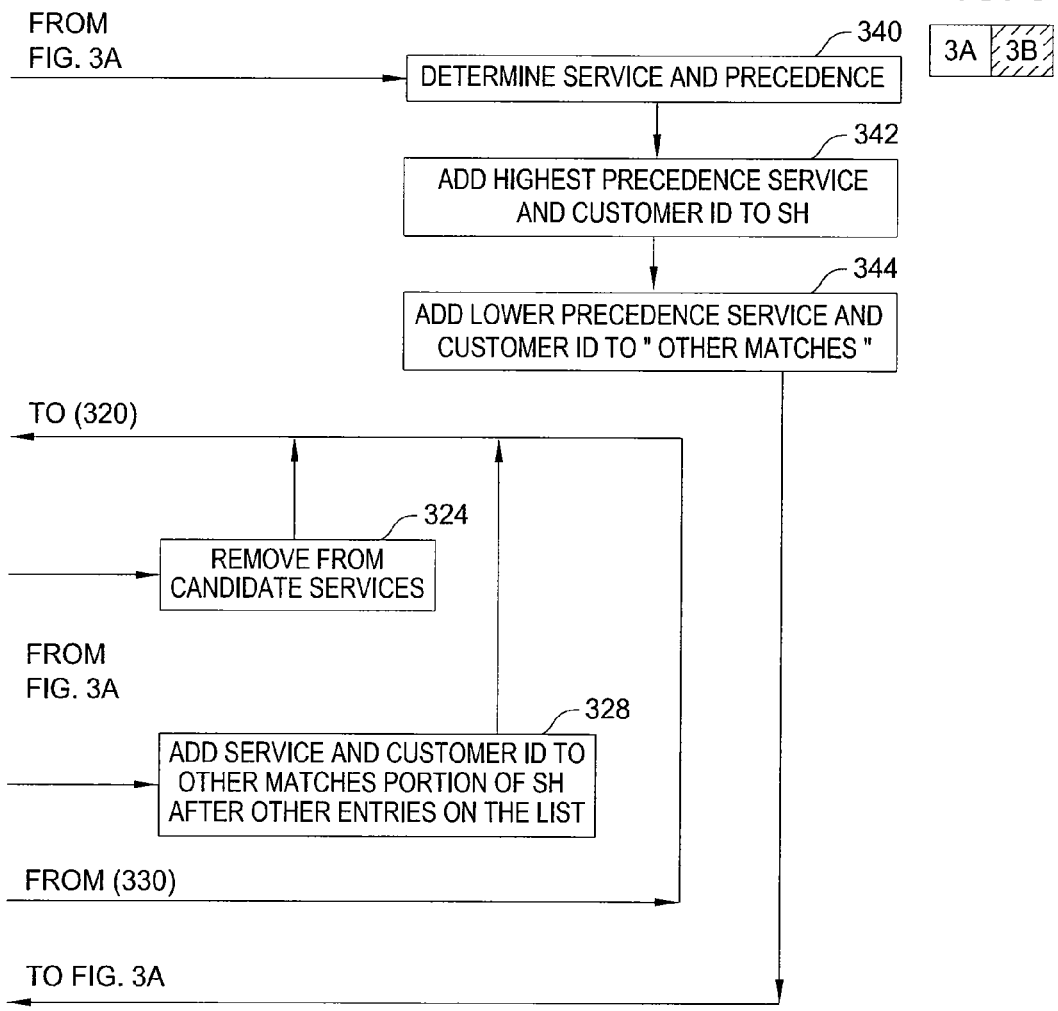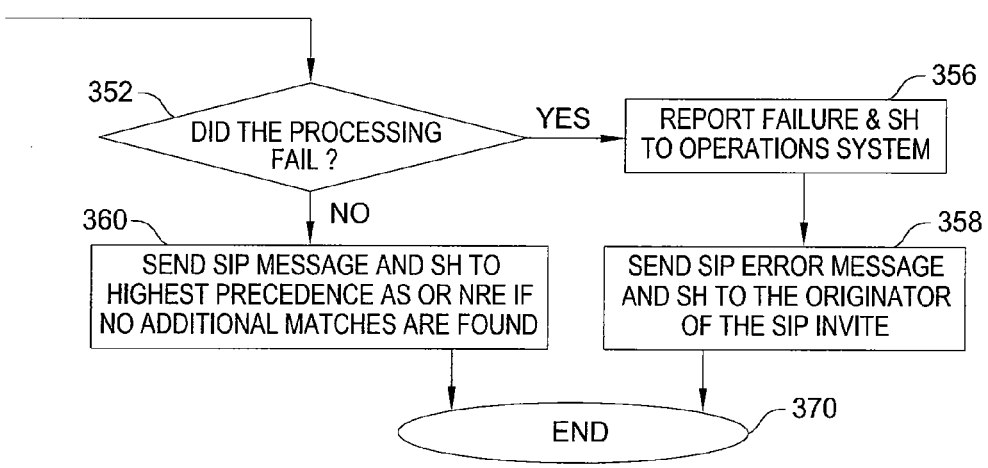
FIG. 3

METHOD AND APPARATUS FOR PROCESSING MULTIPLE SERVICES PER CALL

This application is a continuation of U.S. application Ser. No. 11/322,099, filed Dec. 28, 2005, now U.S. Pat. No. 7,657,015 currently allowed, which is herein incorporated by reference in its entirety.

The present invention relates generally to telecommunications networks and, more particularly, to a method and apparatus for processing multiple services per call on a packet communication network, e.g., a Voice over Internet Protocol (VoIP) network.

BACKGROUND OF THE INVENTION

The Internet has emerged as a critical communication infrastructure, carrying traffic for a wide range of important scientific, business and consumer applications. Some customers are combining all of their services on the Internet infrastructure. VoIP services are becoming ubiquitous. Service providers continue to improve the portfolio of services available to the customers. However, due to the complexity of service providers to support multiple services on every call, customers may have limited access the multitude of services.

Therefore, there is a need to have a flexible means to process several requests for service interaction per call.

SUMMARY OF THE INVENTION

In one embodiment, the present invention discloses a method and apparatus for a server, e.g., a VoIP Session Initiation Protocol (SIP) server, to process multiple services per call. In one embodiment, the method also allows application servers to override a service request and also has the capability to provide input to the operations system in case of failures. Thus, the present method can be used to provide multiple revenue generating services per call, thereby increasing the revenue per call. Namely, it allows the service provider to offer a more complete portfolio of services to the customer.

BRIEF DESCRIPTION OF THE DRAWINGS

The teaching of the present invention can be readily understood by considering the following detailed description in conjunction with the accompanying drawings, in which:

FIG. 3 illustrates a flowchart of the method for SB processing of the signaling history for multiple services per call;

To facilitate understanding, identical reference numerals have been used, where possible, to designate identical elements that are common to the figures.

DETAILED DESCRIPTION

The present invention broadly discloses a method and apparatus for a server, e.g., a VoIP SIP server, to process multiple services per call. Although the present invention is discussed below in the context of processing multiple services for a telecommunications network in accordance with SIP, the present invention is not so limited. Namely, the present invention can be adapted to other communication protocols such as H.232, Media Gateway Control Protocol (MGCP) and the like.

Figure 1:
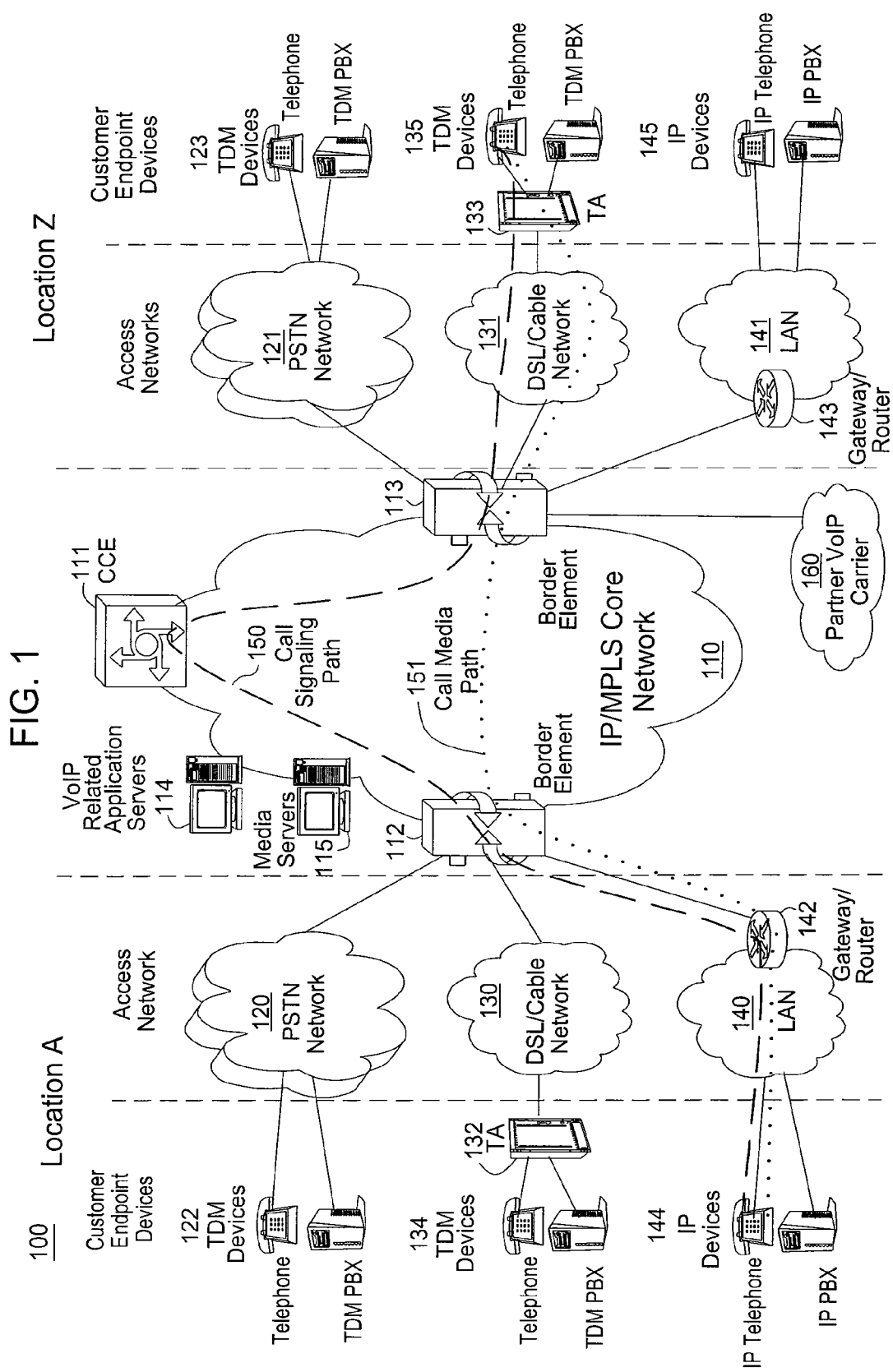
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at various pieces of information in the SIP message, for example, the called party information, and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of packet calls may traverse throughout the entire network. It would be advantageous to be able to provide multiple service interactions per call. For example, a customer may place a call and then proceed to a web service. In other words, the customer may place a call and then proceed to another service instead of hanging up. By allowing a subscriber to access a plurality of services per call, the revenue that is generated per call for a service provider would be significantly increased and the subscriber would receive a more complete portfolio of services.

In order to clearly illustrate the present invention, the following packet network related terminology and concepts will first be described below:

Service precedence;
Service Broker (SB);
Stateless and Stateful service brokers;
Transaction Capabilities Application Part (TCAP);
Transaction Capabilities Application Part-Border Element (TCAP-BE);
A Network Routing Engine (NRE); and
An SB-AS Signaling History.

Service precedence refers to a precedence level between various services that may be applicable for a call. Thus, it would indicate the hierarchy for which services should be applied to a call. For example, a call originating from an IP PBX with a called party number of Toll-Free, 8YY-NXX-XXXX, may identify a number of services to be applied to a call. These services may be originating call screening, Industry Toll-Free DataBase (ITFDB) processing to identify the carrier to process the toll-free call, and the serving carrier's toll-free service. Service precedence would allow these various services to have relative weightings such that originating call screening would occur first, then ITFDB, and finally the serving carrier's toll-free service, if applicable.

When a call is originated, the desired services are identified and a precedence level is assigned to the services. For example, if a customer places a 911 call, the service has a higher precedence than other services that may be identified to apply on the call, e.g., originating call screening. Accordingly, the 911 service may be applied first on the call. Other services identified for the call with lower precedence may be applied later in the call flow, or not at all.

A Service Broker (SB) is a server used for matching services with a request. It determines the services associated with each call, the service precedence and the primary set of AS, and if applicable any backup AS, to provide each service identified.

An SB can be a stateless or stateful SIP server. A Stateless service broker inserts the state information for the call within the SIP message. In a stateful environment, the state of the call, and what services have been applied, or are yet to be applied, is known and the message does not contain this state information. Each method has advantages and disadvantages. The network knowledge required in order to utilize a stateful server necessitates high availability of the platform, where throughput requirements may become a concern. In the contrary, the requirements of an individual stateless server are not as stringent. However, reliability may be achieved through the use of multiple stateless servers. The present invention can be applied to both types of servers.

Signaling System Number 7 (SS7) is a protocol used on switches. It is a global networking protocol standard that is used for basic call setup, call management, call tear down, support of enhanced features such as call forwarding, caller identification, three-way calling, etc. The hardware and software functions of the SS7 protocol stack are divided into functional levels similar to the Open Systems Interconnection (OSI) 7-layer model defined by International Standards Organization (ISO).

Transaction Capabilities Application Part (TCAP) is part of the SS7 signaling protocol. It operates on the session, presentation and application levels to support the exchange of non-circuit related data between applications across the signaling network. The queries and responses are carried in TCAP messages. For example, a network element sends TCAP messages to a Service Control Point (SCP) database to determine the routing numbers associated with a toll-free call. TCAP messages are also used for validation of Personal Identification Numbers (PIN) of calling card users and other applications.

Transaction Capabilities Application Part-Border Element (TCAP-BE) is a border element, e.g., that interacts with the interface to SS7. It also provides conversion between SIP and SS7 TCAP messages to SS7 SCPs, for example the Industry Toll-Free DataBase (ITFDB), the Calling Name database (CNAM), the Line Information DataBase (LIDB), etc. In one embodiment, the TCAP BE appears to the SB as an application server for services provided by the TCAP BE. Therefore, throughout the description of the current invention, statements or references to AS equally apply to TCAP BE.

The Network Routing Engine (NRE) provides the routing information to the destination BE. The route information is used to set up the call between the source and destination BEs. In one embodiment, SIP is used between the CCE and the NRE with the NRE acting as the SIP redirect server.

An SB-AS signaling history is referred to broadly as Signaling History (SH) and it is carried among the SB, CCE, AS, TCAP BE, NRE and BE. The SH allows the SB to determine the previous service matches that have been processed, or service matches that may be allowed or disallowed, for the request.

In one embodiment, the SB is stateless and the signaling history carries the state of the AS or TCAP BE processing matches for the call. In one embodiment, the signaling history is carried in the SIP messages among the SB, TCAP BE and AS.

The signaling history also enables the AS or TCAP BE to allow or disallow other specific service interactions or all other service interactions. The AS can accomplish this because the service broker identifies and forwards the other lower precedence matches. The current invention enables the AS to disallow a match or remove a match from the history whether it is received from the service broker or not.

In general, the signaling history enables the AS or TCAP BE to determine what service and customer logic should be executed for the call. Furthermore, the signaling history also allows operations centers to know at the point of a network failure the services and customers impacted by the outage. The SB, NRE, AS, TCAP BE and BE have the history available to them to report to operations center when service is interrupted.

Each entry in the signaling history contains information for the new highest service precedence match. The information contained in the signaling history includes but is not limited to: service information, customer ID or record, and status information. Additionally, a version number of the signaling history may also be included to address future compatibility issues.

The service information includes service name identifiers such as Originating Call Screening, Toll-Free, etc. The Originating Call Screening determines if calls are allowed or disallowed from originating in the VoIP network. Toll Free is a service where the call may be distributed to call agents and the called party pays the charges on the call. The customer ID is derived from a match with the subscriber record. It is used to identify customer specific logic associated with an individual service. Some or all subsequent services for calls may be disallowed regardless of the caller. In the case that all subsequent services may be disallowed on a call, the AS uses a special service name, for example a default such as "*". In the case that an individual service is disallowed, the AS inserts into the signaling history the particular service name and the customer ID. If the call is being disallowed regardless of the customer ID, the AS may replace the customer ID information by a default such as "*". The status information indicates the status for processing by the AS. The service broker marks the highest service precedence matches as "selected" indicating that the AS service match is chosen. The AS indicates "overridden" for service interactions not allowed between the matched service and the lower service precedence matched services. For example, the AS may disallow interactions between a higher precedence emergency 911 service and a lower precedence Originating Call Screening service.

The AS may process the signaling history when it receives the SIP invite. However, the present invention does not require that the AS send an acknowledgement of the AS processing such as "AS processing complete". This eliminates steps in the AS processing when no modifications are needed. It also allows other application servers not to have compatibility issues. If a process completion acknowledgement message were required, application servers deployed prior to the requirement would not be compatible.

In one embodiment, each entry in the signaling history contains the service information, customer ID and status information as described above. Thus, the signaling history is a list of actual AS services selected by the service broker or the next highest AS processing to be selected. The next highest AS entry to be selected is the last entry on the history list. Alternatively, the next highest AS could be the first entry on the history list, as long as the method is consistent throughout the network. The information containing the service information, customer ID and status information is repeated for every AS where the initial processing is complete or the entry is for the next highest AS service match to which the service broker will be redirecting. Matches where the AS disallows the interaction are marked as "overridden."

The SB marks some matches as "other matches" and forwards them to the AS. Other matches show the other lower precedence matches that were obtained from the SB search. The service and customer ID information are repeated, in the order of the determined precedence, for every service match that is not the highest precedence or not already on the list. The AS, to determine which other potential service interactions to disallow, may use this information.

Thus, the SB initially adds SH to the initial message for the call it receives. The SB determines such calls from the fact that there is no SH present in the message. The SH is then optionally updated by the AS when it needs to override a service match. In this case, the AS adds to the history the service, customer ID and status. In the case where the AS overrides the interaction, the AS provides the service, customer ID and the "overridden" status.

The current invention enables a server, e.g., a VoIP SIP server, for performing service determination, namely the SB, to process multiple services per call. The present invention also enables the AS to eliminate other service interactions per call. The SIP server can be stateful or stateless. The present invention utilizes the concept of the Signaling History (SH) to enable the SIP server to determine the services that have already been processed for the call. If the AS overrides any services, after the SB has determined the applicable services, the AS adds the information in the SH to allow the SB to determine the status. Furthermore, the present invention allows services and customer ID to be reported to the operations center when failures occur. The operations center then knows what services are impacted and can initiate mitigation steps.

Figure 2:
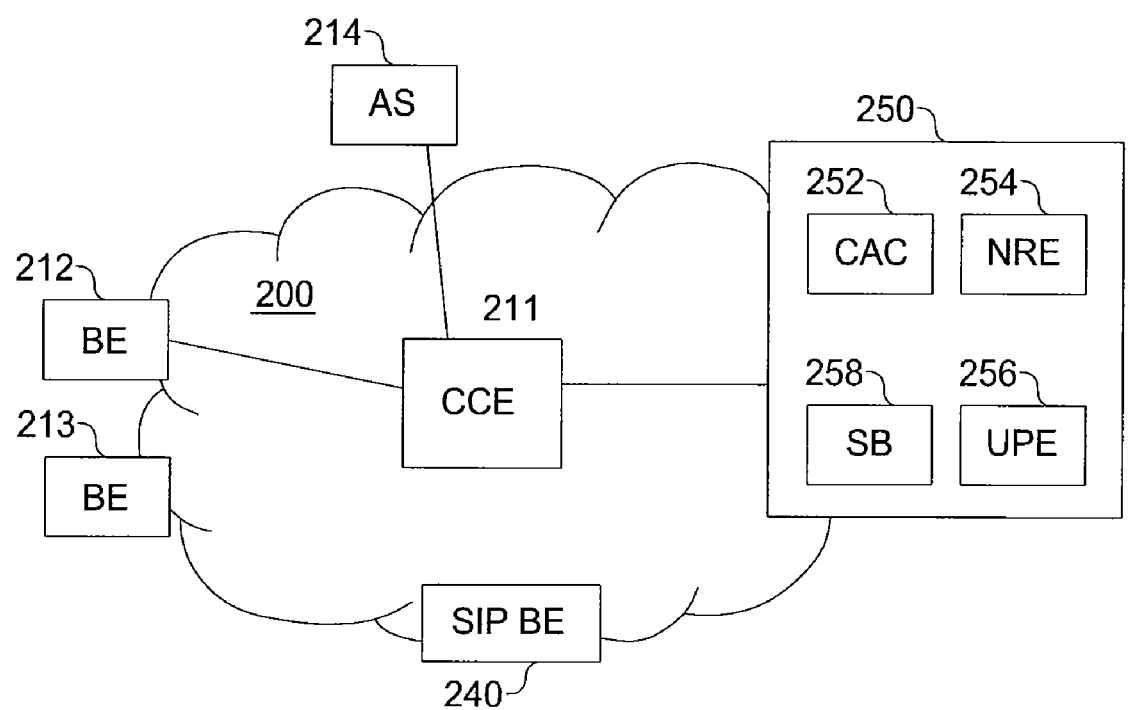
FIG. 2 illustrates a high-level VoIP network.

FIG. 2 illustrates a high-level exemplary VoIP network 200. It has been simplified to contain only the components that are useful to understand the current invention and relevant connectivity. It is not intended to contain all VoIP network connectivity. The network includes a CCE 211, a plurality of Border Elements (BE) 212 and 213, an Application Server (AS) 214, a SIP BE 240 and a common network functions module 250. The common network functions module includes but is not limited to, a Call Admission Control (CAC) 252, a NRE 254, a User Profile Engine (UPE) 256 and a Service Broker 258. Note that the common network functions module may be either a component of the CCE, a separate network element containing all the common network functions, or each individual function may be a separate network element.

In operation, the CCE 211 interacts with the CAC 252 to authorize users and admits calls onto the network. In one embodiment, the NRE is tasked with translating the network address to an IP address and the UPE is tasked with determining whether the user is offline, logged on, etc.

The CCE also interacts with the Service Broker to determine the services associated with a call. The SB may act as the SIP redirect server in the case of a stateless SB, or it may be also be a proxy server or Back-To-Back-User-Agent (B2BUA). The SB provides a list of services for each call. The SB determines the service precedence for the call and identifies the appropriate AS. The SIP message is then sent to the AS. Note that the set of services that apply to a call may change based on the response from the AS. For example, if the AS changes the called party number in the Request-URI, this may change certain service matches that were dependent on the original called part number. Accordingly, after each AS process a call, the SB must again determine the set of services for the call.

The SB, AS, TCAP BE, NRE, CCE and other BEs process the signaling history as needed. The processing method depends on the role of the network element.

Figure 4:
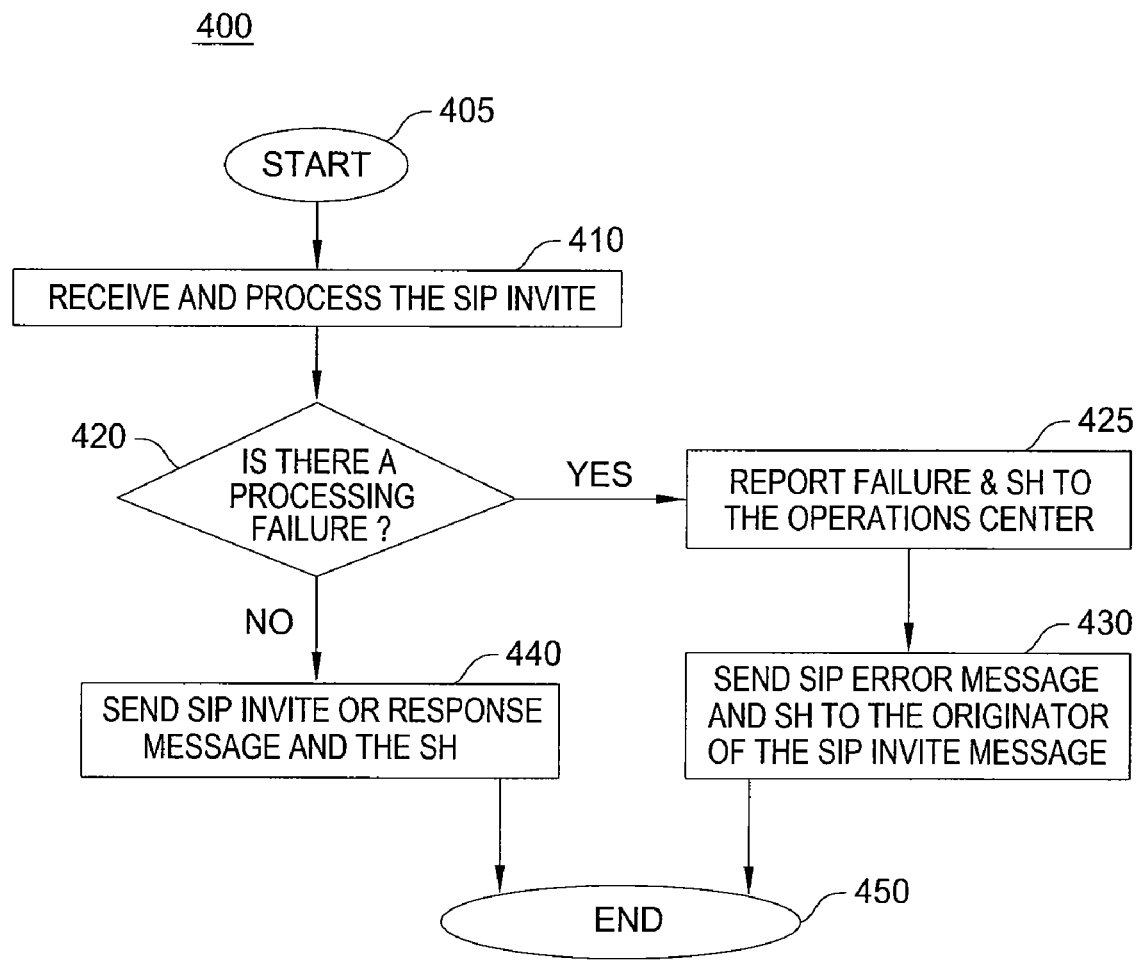
FIG. 4 illustrates a flowchart of the method for CCE, NRE and BE processing of the signaling history for multiple services per call.
Figure 5:
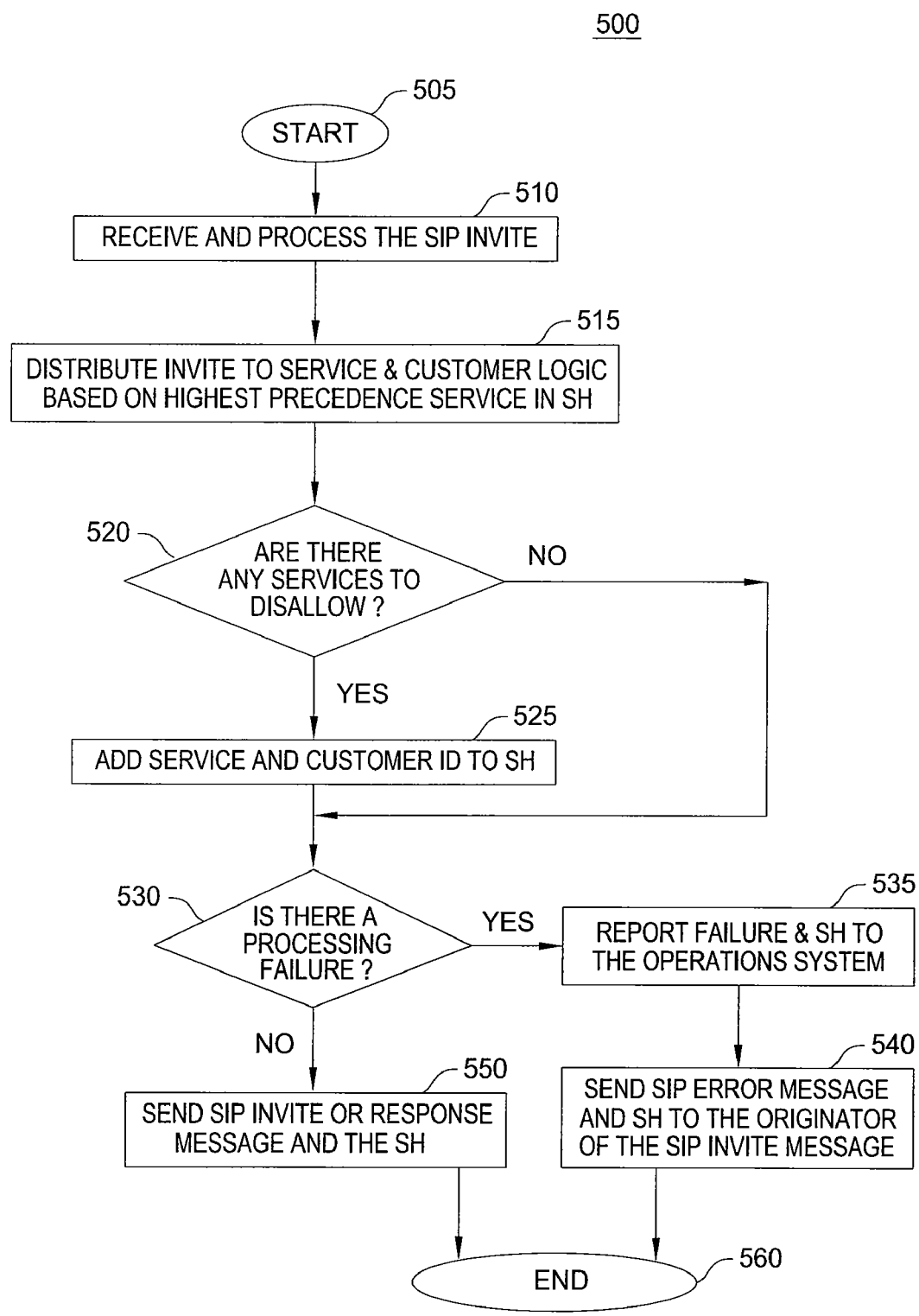
FIG. 5 illustrates a flowchart of a method for an AS or TCAP-BE processing of the signaling history for multiple services per call.

FIG. 3 illustrates a flowchart of an exemplary method 300 for processing of the signaling history by the SB for multiple services per call. The flowchart of the method for processing the signaling history by the CCE, NRE and various BEs is illustrated in FIG. 4. The flowchart of the method for processing the signaling history by the AS and TCAP BE is illustrated in FIG. 5. Method 300 starts in step 305 and proceeds to step 310.

In step 310, method 300 receives and processes a SIP invite message. For example, SIP invite message may be generated in response to a call set-up request.

In step 312, method 300 determines whether a signaling history (SH) is present by analyzing the SIP message when it is engaged by the CCE. If there is no SH, the call is new and the method proceeds to step 340. If there is a signaling history, then the method proceeds to step 314.

In step 340, the method performs service and precedence determination for the new call. For example, the call may have several services with various service precedence levels. Once the services and the precedence levels are identified, the method proceeds to step 342.

In step 342, the method determines the highest precedence service. It then adds the service, customer ID and status of the highest precedence service of the new call to the SH and proceeds to step 344 to handle the other services for the same call.

In step 344, the method adds the service and customer ID of the lower precedence services of the new call to the "other matches" portion of the list. It then proceeds to step 350 to determine the address of the AS that can best provide the service(s) for the customer.

If there is a signaling history in step 312, the call is not new and method 300 proceeds to step 314. In step 314, the method determines the services and the associated precedence levels. Thus, a list of derived candidate services and customer IDs is created.

In step 316, method 300 compares the service and the customer ID in the signaling history to the list of derived candidate services and customer ID from step 314. For example, the signaling history may contain entries that match the same service and customer ID, or the same service but not the same customer ID.

In step 320, method 300 determines whether there are any services in the list of derived candidate services and customer IDs established in step 314. If there are no services, it proceeds to step 350 to determine the AS for the service with the highest service precedence. If there are services on the list, it proceeds to step 322.

In step 322, method 300 determines whether a derived candidate service and a customer ID are in the SH. If they are in the SH, then it means that the service has already been processed and the method proceeds to step 324 to remove the service from the candidate services list. If they are not in the SH, the method proceeds to step 326.

In step 324, the method removes the service from the candidate services list because it is already processed and proceeds to step 320 to determine whether there are any other services on the list of candidate service and customer IDs established in step 314.

In step 326, the method determines whether this is the service with the highest service precedence level. If it is not, the method proceeds to step 328 to add the service and customer ID to the "Other Matches" portion of the list containing the signaling history. If this is the service with the highest service precedence level, the method proceeds to step 330 to add the service and customer ID to the SH.

In step 328, the method adds the service and customer ID to the "other matches" portion of the list and proceeds back to step 320 to process other services on the list. Note that the AS selected for the call is the server that can best fulfill the service for the highest service precedence match. Therefore, the services on the "other matches" portion may remain on the list longer.

In step 330, method 300 adds the service and customer ID to the SH after other services and customer IDs. Therefore, the current entry becomes the latest entry. The method then proceeds back to step 320 to process other services on the list. The method continues the process until there are no services left on the list in step 320. Then the method proceeds to step 350.

In step 350, the method determines the address of the pertinent application server for the service with the highest service precedence level. The address contains items such as URL, IP address, port number etc. This step is applicable for both new calls and calls that had SH.

In step 352, method 300 determines whether the processing of the SIP message and the highest service precedence match failed or succeeded. If the processing failed, then the method proceeds to step 356 to report the failure to the operations center and send an error message. If the processing succeeded, then the method proceeds to step 360 to send the SIP message to the AS for the service with the highest service precedence level.

In step 356, method 300 reports the failure and the SH to the operations center. Since the SH is contained in the report, the operations center can use the information for diagnosis. The method then proceeds to step 358.

In step 358, method 300 sends a SIP error message and the SH as appropriate to the originator of the SIP invite. The method then proceeds to step 370 to end processing the current request.

In step 360, method 300 sends the SIP message to the pertinent AS for the service with highest service precedence level for the successful processes. If no additional matches are found, then the method sends the SH to the NRE and proceeds to step 370.

In step 370, method 300 ends the processing of the SH by the service broker and continues to the SIP processing.

FIG. 4 illustrates a flowchart of an exemplary method 400 for processing of the signaling history by the CCE, NRE and BE for multiple services per call. Unlike the SB, the CCE, NRE and the various BEs process the signaling history only when it is necessary to report failures to the operations center and/or to send SIP error messages when needed.

Method 400 starts at step 405 and proceeds to step 410. In step 410, method 400 receives and begins processing the SIP invite messages by the CCE, NRE or BE.

In step 420, method 400 determines whether there is a processing failure. If there is a failure, then the method proceeds to step 425 to report the failure to the operations center. If there is no failure, then the method proceeds to step 440.

In step 425, method 400 reports the failure and the SH to the operations center. Since the SH is included in the report, the operations center can use the SH to perform diagnosis. The method then proceeds to step 430.

In step 430, method 400 sends SIP error messages and the SH as appropriate to the originator of the SIP invite. If there were transmission errors, the originator may send another SIP invite message. The method then proceeds to step 450.

In step 440, method 400 sends the SIP invite and response messages for the processes that did not fail. The SH is included in the messages. The method then ends in step 450.

FIG. 5 illustrates a flowchart of an exemplary method 500 for processing of the signaling history by the AS and the TCAP BE for multiple services per call. Method 500 starts in step 505 and proceeds to step 510.

In step 510, method 500 receives and processes the SIP invite messages.

In step 515, method 500 distributes the SIP invite based on the service for the highest service precedence level in the SH to applicable service and customer logic, based on the customer ID, and proceeds to step 520.

In step 520, method 500 determines whether there are any services to disallow. If there are services to disallow, then the method proceeds to step 525 to add the service and customer ID to the SH. If there are no services to disallow, then the method proceeds to step 530.

In step 525, method 500 adds the service and customer ID to the SH. It also adds the status as "overridden" to indicate that the AS disallowed this match. Since the disallowed service is included in the SH, it is treated as if it has been previously processed by all recipients of the SH. The method then proceeds to step 530.

In step 530, method 500 determines whether the process failed or succeeded. If the process failed, then the method proceeds to step 535 to report the failure and sends the SH to the operations center. If the process succeeded, the method proceeds to step 550 to send the SIP invite or response message and the SH to the SB.

In step 535, method 500 reports the failure and SH to the operations center. The SH can be used by the operations center for diagnosis. The method then proceeds to step 540.

In step 540, method 500 sends the SIP error message and the signaling history to the originator of the SIP Invite message. The method then proceeds to step 560 to end processing of the current request.

In step 550, method 500 sends the SIP invite or response message and SH to the SB. The method then ends in step 560.

Figure 6:
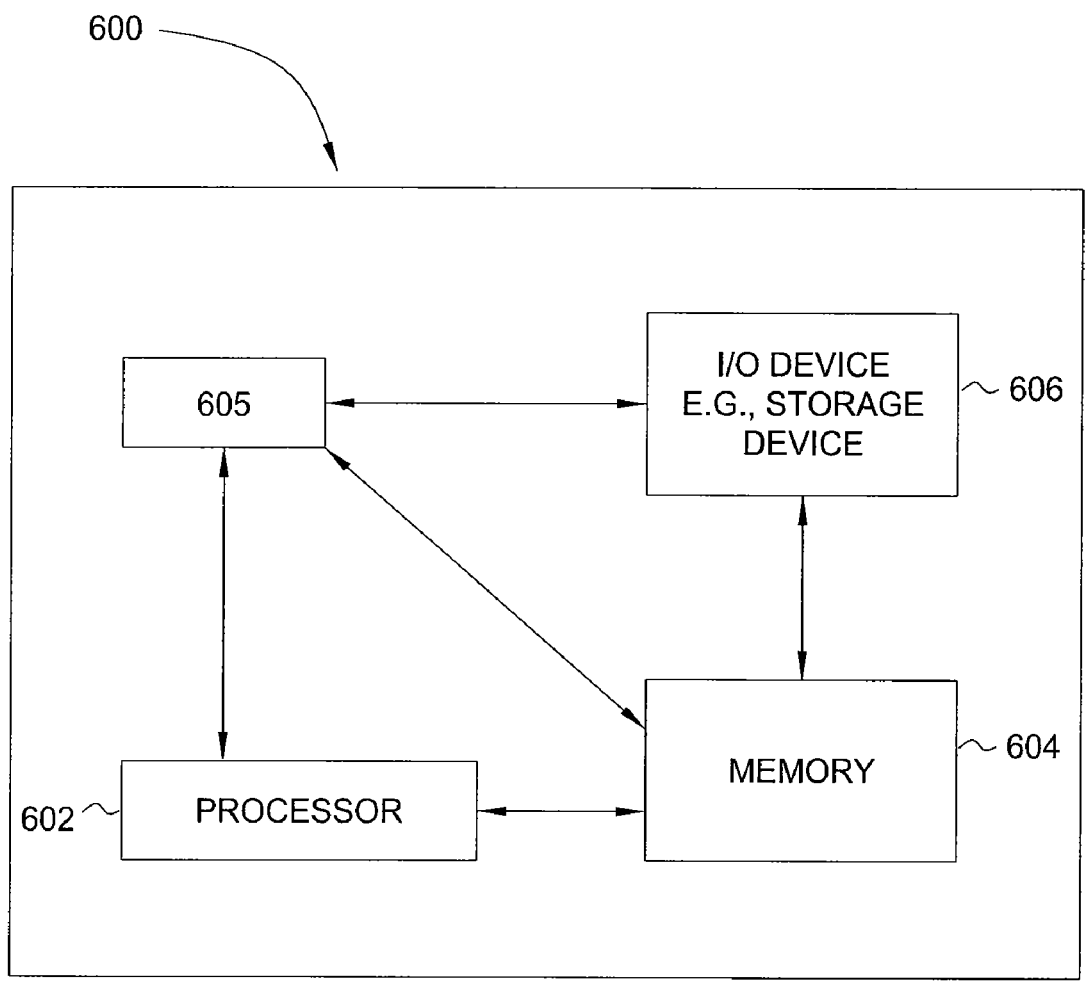
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a multiple services per call processing module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present multiple services per call processing module or process 605 can be loaded into memory 604 and executed by processor 602 to implement the functions as discussed above. As such, the present multiple services per call processing method 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a plurality of services on a single call in a communication network, comprising:

receiving a request for a plurality of services in a single call from a subscriber;

determining whether a signaling history of the single call is presently associated with the request; and providing the plurality of services to the subscriber in accordance with a precedence level associated with each one of the plurality of services in the single call.

2. The method of claim 1, wherein the communication network comprises a voice over internet protocol network.

3. The method of claim 1, wherein the request is received by a service broker.

4. The method of claim 3, wherein the determining whether the signaling history is presently associated with the request is performed by the service broker.

5. The method of claim 4, wherein if the service broker determines that the signaling history is not presently associated with the request, then the precedence level and a customer identification are determined for each of the plurality of services, where the plurality of services is ordered according to the precedence level, and where a service and the customer identification for each of the plurality of services are entered into a newly created signaling history, where one of the plurality of services is deemed to be a highest precedence service and remaining services from the plurality of services are deemed to be lower precedence services that are listed as other matches.

6. The method of claim 4, wherein the service broker determines an application server for servicing one of the plurality of services.

7. The method of claim 6, wherein the application server disallows the one of the plurality of services.

8. The method of claim 6, wherein the application server distributes the request to a service and customer logic in accordance with the signaling history.

9. The method of claim 1, wherein the request comprises a session initiation protocol invite message.

10. The method of claim 1, further comprising:
generating a failure report if the providing the plurality of services to the subscriber fails.

11. The method of claim 5, wherein if there are no additional service matches, then the single call is delivered to a network routing engine for routing.

12. A computer-readable medium having stored thereon a plurality of instructions, the plurality of instructions including instructions which, when executed by a processor, cause the processor to perform a method for providing a plurality of services on a single call in a communication network, comprising:
receiving a request for a plurality of services in a single call from a subscriber;
determining whether a signaling history of the single call is presently associated with the request; and
providing the plurality of services to the subscriber in accordance with a precedence level associated with each of the plurality of services in the single call.

13. The computer-readable medium of claim 12, wherein the communication network comprises a voice over internet protocol network.

14. The computer-readable medium of claim 12, wherein the request is received by a service broker.

15. The computer-readable medium of claim 14, wherein the determining whether the signaling history is presently associated with the request is performed by a service broker.

16. The computer-readable medium of claim 15, wherein if the service broker determines that the signaling history is not presently associated with the request, then the precedence level and a customer identification are determined for each of the plurality of services, where the plurality of services is ordered according to the precedence level, and where a service and the customer identification for each of the plurality of services are entered into a newly created signaling history, where one of the plurality of services is deemed to be a highest precedence service and remaining services from the plurality of services are deemed to be lower precedence services that are listed as other matches.

17. The computer-readable medium of claim 15, wherein the service broker determines an application server for servicing one of the plurality of services.

18. An apparatus for providing a plurality of services on a single call in a communication network, comprising a service broker configured to:
receive a request for a plurality of services in a single call from a subscriber;
determine whether a signaling history of the single call is presently associated with the request; and
provide the plurality of services to the subscriber in accordance with a precedence level associated with each one of the plurality of services in the single call.

19. The apparatus of claim 18, wherein if the service broker determines that the signaling history is not presently associated with the request, then the precedence level and a customer identification are determined for each of the plurality of services, where the plurality of services is ordered according to the precedence level, and where a service and the customer identification for each of the plurality of services are entered into a newly created signaling history, where one of the plurality of services is deemed to be a highest precedence service and remaining services from the plurality of services are deemed to be lower precedence services that are listed as other matches.

20. The method of claim 1, wherein the communication network comprises a service over internet protocol network.

* * * * *